March 28, 1939. M. C. PUTNAM 2,151,716
WOOD JOINT FASTENER
Filed March 21, 1935
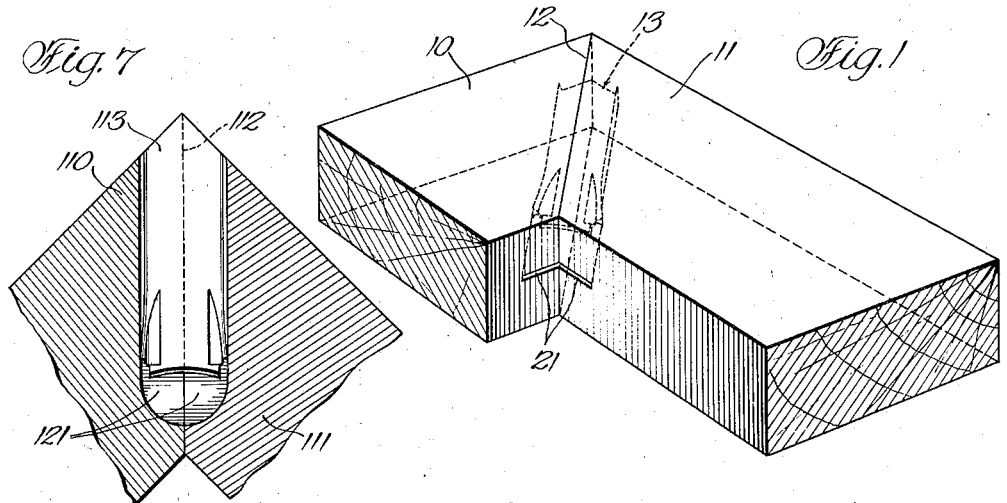
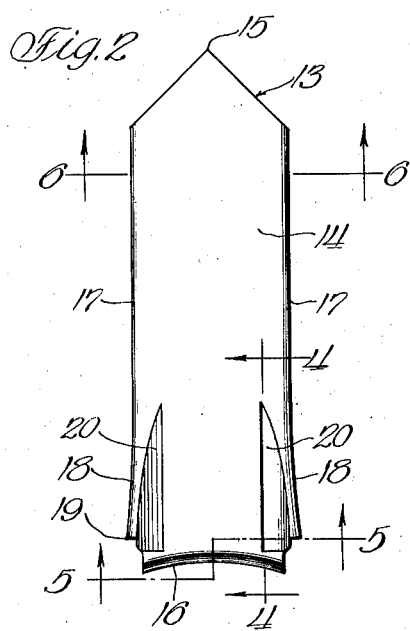
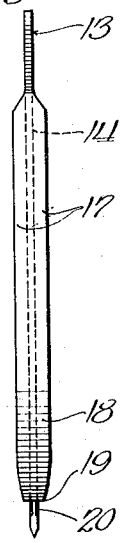
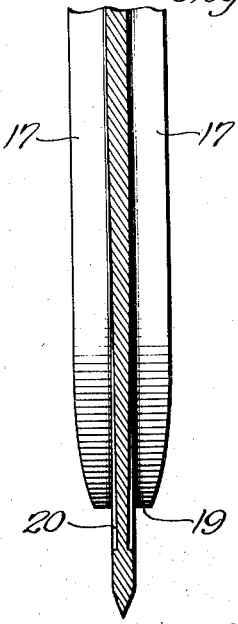
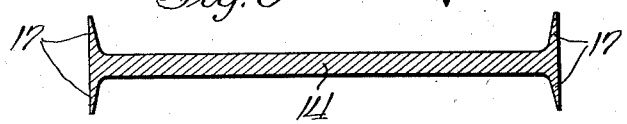
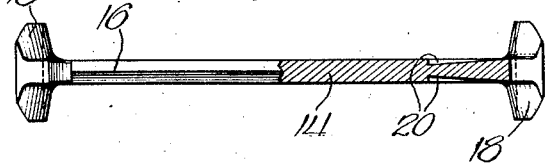
INVENTOR.
Mabel C. Putnam
BY
ATTORNEY.

Patented Mar. 28, 1939

2,151,716

UNITED STATES PATENT OFFICE 2,151,716

WOOD JOINT FASTENER

Mabel C. Putnam, Chicago, Ill., assignor to Clamp Nail Company, Chicago, Ill., a corporation of Illinois Application March 21, 1935, Serial No. 12,191

2 Claims. (Cl. 85—11)

The present invention relates to a dowel and particularly to an article of manufacture for rigidly fastening objects at their abutting ends which are generally angular to one another.

A primary object of the invention is the provision of a dowel having flaring flanges with an arcuate cutting edge therebetween substantially narrower than such flaring flanges.

A secondary object of the invention is to provide a dowel having at one end an arcuate cutting edge and at the other end a pointed section with edges parallel with the faces of the surfaces of the objects into which the dowel is driven.

Another object of the invention is the provision of a new and improved type of dowel having flaring flanges shaped to draw the members of a corner construction together coincidentally with the driving of the dowel thereinto from the outer side of such corner construction.

Still another object of the invention is the provision of an improved dowel having a flat body portion, flaring flanges, and a cutting edge all formed of a single piece of suitable material.

With the above and other desirable objects in view the invention is hereinafter set forth with reference to the single sheet of drawing hereby made a part of this specification and upon which:

Figure 1 is a perspective view with an embodiment of the invention in dotted lines applied to a corner construction;

Figure 2 is a front elevation of the dowel illustrated in Figure 1;

Figure 3 is a side elevation of the article illustrated in Figure 2;

Figure 4 is an enlarged section taken on the line 4—4 of Figure 2;

Figure 5 is a similarly enlarged view taken on line 5—5 of Figure 2;

Figure 6 is a similar view taken on the line 6—6 of Figure 2; and

Figure 7 is a transverse section of a corner joint showing dowel in a saw kerf extending partly across the pieces joined by the dowel.

Like reference characters are used to designate similar parts in the drawing and in the description that follows.

In Figure 1 of the drawing, illustrating one embodiment of the present invention, there is shown as a part of a rectangular frame two side members 10 and 11 beveled at a forty-five degree angle at their ends, the beveled ends abutting at 12 to form a right angle. Members 10 and 11 are secured together by means of a clamp nail or dowel 13.

The dowel 13 is substantially of an I beam cross section as shown in Figure 6 and is formed of an integral piece having a flat rectangular web 14. The dowel 13 has a driving end 15 terminating in a centrally located point defining the intersection of edges at a ninety degree angle.

At the other end of the dowel is an arcuate driven edge 16. The length of the edge 16 is slightly less than the width of the web 14. The arcuate driven edge 16 is formed by beveling the flat web surfaces until a sharp cutting edge is obtained.

Flanges 17 extend along the sides of the web from the base of point 15. For the major length thereof, flanges 17 are parallel, but as they approach the cutting edge 16, the flanges flare outwardly as indicated at 18, the flares 18 terminating in points 19 which points are slightly short of the driven or cutting edge 16.

The web 14 is swaged (indicated 20) at each side. Each swaging extends from the flares 18 to beyond the point 19 substantially parallel to and adjacent to the flanges 17. Each swaging increases from shallowness at its inner end to considerable depth as it approaches the point 19 of the flanges 17.

Before driving a dowel 13 into a joint, straight saw-cut recesses 21 are formed in the frame members 10 and 11. The saw-cuts 21 extends along the abutting faces of the members 10 and 11 in parallelism. The depth of each saw-cut recess 21 is approximately one-half the maximum width of the dowel 13.

The cutting or driving edge 16 is forced into the parallel saw-cuts 21 at the outside corner of the frame members 10 and 11. Thence, by applying force to the driving end of the dowel 13, it is forced inwardly of the frame in the path of the saw-cuts 21. The cutting edge 16 guides the dowel 13 and maintains the dowel generally within such saw-cuts.

During the driving operation, the flared flange portions 18 bite into the material of the frame members 10 and 11 at the bottom of saw-cuts 21 drawing the frame members toward one another. The parallel flanges 17 maintain the relative position of the frame members 10 and 11 after they have been drawn tightly together by the flaring parts 18. When dowel 13 is driven fully within the members 10 and 11, the driving end having edges at a ninety degree angle conforms with and is parallel to the outer surfaces of the right angle frame members 10 and 11, thus providing a smooth flush surface which obviates the necessity of filling holes or crevices with putty or the like before applying a protective coating to the whole.

In Figure 7, two frame members 110 and 111 are joined at 112 by a dowel 113. Dowel 113 is driven into opposed parallel saw kerfs 121 which extend across but a part of the abutting faces of the members 110 and 111. Thus the members 110 and 111 have at the inner edge of the joint therebetween smooth surfaces. A construction such as is shown in Figure 7 is highly desirable for picture frames.

While the device described and illustrated has a driving end cut to have edges with a ninety degree angle, it is obvious that the driving end may be cut to conform with the outer surface of a frame regardless of its configuration.

What is claimed as new and is desired to be secured by Letters Patent of the United States is:

1. A dowel comprising a substantially flat web having an arcuate cutting edge at the leading end of less width than said web, means forming parallel flanges at the lateral edges of said web, the forward edge of said flanges terminating a substantial distance rearwardly of said cutting edge, said web being swaged adjacent said flanges and adjacent said leading end of the web whereby to provide recesses in the web and to flare outwardly the forward ends only of said parallel flanges, said recesses being arranged inwardly of the leading edge and spaced therefrom and extending laterally beyond the termination points of said cutting edge and communicating with an adjacent edge of the web, a flared portion of each flange extending along one margin of its associated recess.

2. A dowel comprising a substantially flat web having an entering edge at the leading end of less width than said web, means forming parallel flanges at the lateral edges of said web, the forward edge of said flanges terminating a substantial distance rearwardly of said entering edge, said web being swaged adjacent said flanges and adjacent said leading end of the web whereby to provide recesses in the web and to flare outwardly the forward ends only of said parallel flanges, said recesses being arranged inwardly of the leading edge and spaced therefrom and communicating with an adjacent edge of the web, a flared portion of each flange extending along one margin of its associated recess.

MABEL C. PUTNAM.